United States Patent
Tong et al.

(10) Patent No.: US 11,366,954 B2
(45) Date of Patent: Jun. 21, 2022

(54) TEXT PREPARATION APPARATUS

(71) Applicant: Hitachi, Ltd., Tokyo (JP)

(72) Inventors: Bin Tong, Tokyo (JP); Makoto Iwayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1041 days.

(21) Appl. No.: 15/895,182

(22) Filed: Feb. 13, 2018

(65) Prior Publication Data
US 2018/0232342 A1  Aug. 16, 2018

(30) Foreign Application Priority Data
Feb. 16, 2017  (JP) .............................. JP2017-026630

(51) Int. Cl.
*G06F 40/111* (2020.01)
*G06F 40/56* (2020.01)
*G06N 3/08* (2006.01)
*G06N 3/04* (2006.01)

(52) U.S. Cl.
CPC ............ *G06F 40/111* (2020.01); *G06F 40/56* (2020.01); *G06N 3/0445* (2013.01); *G06N 3/0454* (2013.01); *G06N 3/08* (2013.01); *G06N 3/084* (2013.01)

(58) Field of Classification Search
CPC ..... G06F 40/111; G06F 40/56; G06N 3/0445; G06N 3/0454; G06N 3/08; G06N 3/084
See application file for complete search history.

(56) References Cited

U.S. PATENT DOCUMENTS 9,858,524 B2 *  1/2018  Bengio ................ G06N 3/0472
10,679,643 B2 *  6/2020  Diamos ................... G10L 19/00
(Continued)

FOREIGN PATENT DOCUMENTS
JP  2008-003655 A  1/2008

OTHER PUBLICATIONS

Xu et al. "Show, attend and tell: Neural image caption generation with visual attention." International conference on machine learning. PMLR, (Year: 2015).*
(Continued)

*Primary Examiner* — Michael J Huntley
*Assistant Examiner* — Adam C Standke
(74) *Attorney, Agent, or Firm* — Foley & Lardner LLP

(57) ABSTRACT

A text preparation apparatus is configured to in the decoding processing: perform first-layer recurrent neural network processing for phrase types to be used in the text and second-layer recurrent neural network processing for words appropriate for each of the phrase types; determine a phrase appropriate for each of the phrase types based on outputs of the second-layer recurrent neural network processing; generate a first vector set from a state vector of a previous step in the first-layer recurrent neural network processing and the feature vector sets, each vector of the first vector set being generated based on similarity degrees between individual vectors in one of the feature vector sets and the state vector; generate a second vector based on similarity degrees between individual vectors in the first vector set and the state vector; and input the second vector to a given step in the first-layer recurrent neural network processing.

6 Claims, 11 Drawing Sheets

(56) References Cited

U.S. PATENT DOCUMENTS

| | | | | |
|---|---|---|---|---|
| 2014/0116776 A1* | 5/2014 | Marx | ................... | E21B 49/00 |
| | | | | 706/11 |
| 2018/0143966 A1* | 5/2018 | Lu | ..................... | G06V 30/194 |
| 2021/0165963 A1* | 6/2021 | Mendes | ............... | G06F 40/30 |

OTHER PUBLICATIONS

Krause et al. "A Hierarchical Approach for Generating Descriptive Image Paragraphs." arXiv preprint arXiv:1611.06607 (Year: 2016).*

Yang et al. "Stacked attention networks for image question answering." Proceedings of the IEEE conference on computer vision and pattern recognition. (Year: 2016).*

Wang et al. "Hierarchical attention network for action recognition in videos." arXiv preprint arXiv:1607.06416 (Year: 2016).*

Tong et al. "Production Estimation for Shale Wells with Sentiment-Based Features from Geology Reports." 2015 IEEE International Conference on Data Mining Workshop (ICDMW). IEEE, (Year: 2015).*

\* cited by examiner

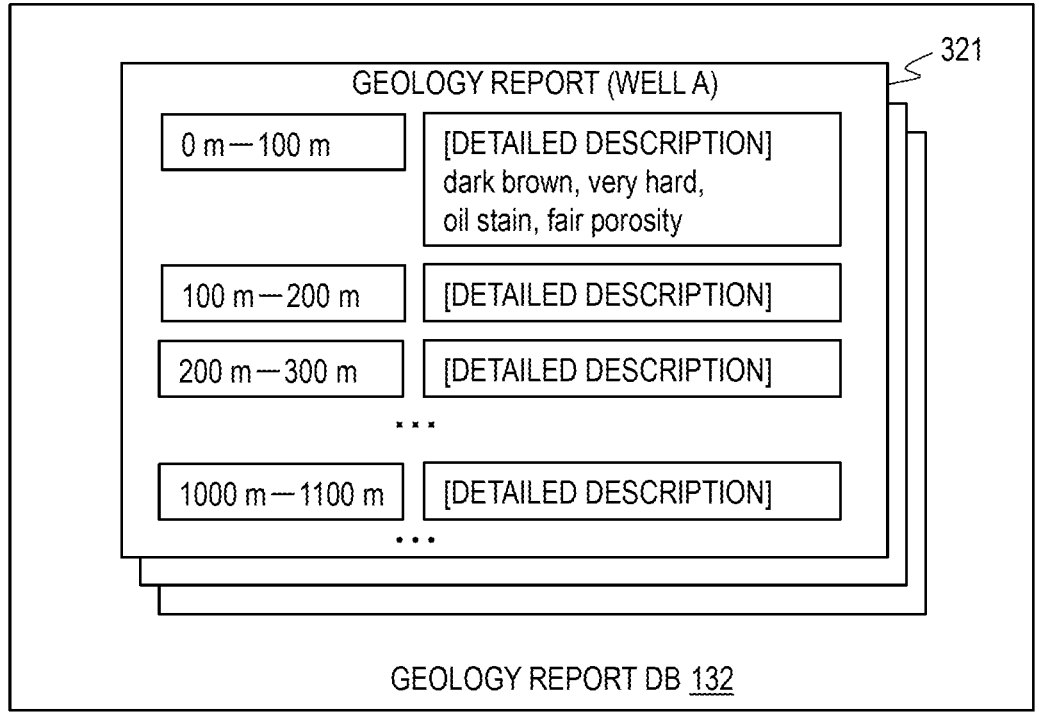

FIG. 4

| ROCK PROPERTY | PHRASES |
|---|---|
| Rock Type | sandstone, mudstone, limestone, dolomite, ... |
| Rock Color | light gray, cream, tan, off white, light gray, ... |
| Texture | fine microcrystalline, trace microcrystalline,... |
| Composition | slightly sandy, very sandy, trace sandy, ... |
| Porosity | no visible porosity, fair porosity, ... |
| Cut | no cut, milky cut, cloudy cut, streaming cut, ... |
| ... | .... |

EXAMPLES OF ROCK PROPERTIES AND PHRASES IN GEOLOGY REPORTS

FIG. 5

MEASURED VARIABLE

| | GR | ROP | C1 | C2 | C3 | C4 |
|---|---|---|---|---|---|---|
| Rock Type | 0.05 | 0.15 | 0.6 | 0.15 | 0.05 | 0 |
| Rock Color | | | | | | |
| Texture | | | | | | |
| Composition | | | | | | |
| Cut | | | | | | |
| Porosity | | | | | | |

ROCK PROPERTY

FIG. 15

| PHRASE | MEASURED VARIABLE | PATTERN |
|---|---|---|
| Fair Porosity | Gamma Ray | |
| Low Porosity | Gamma Ray | |
| Cloudy Cut | ROP | .... |
| ... | .... | .... |

FIG. 16

TEXT PREPARATION APPARATUS

CLAIM OF PRIORITY

The present application claims priority from Japanese patent application JP2017-026630 filed on Feb. 16, 2017, the content of which is hereby incorporated by reference into this application.

BACKGROUND

This invention relates to a technique to automatically prepare a text from measured data.

In shale oil and gas mining, sensors attached on the drill periodically measure various variables (such as gamma rays and resistance). In the meanwhile, the analyst analyzes rocks sampled in a longer spun to prepare a text report describing the characteristics (such as color, hardness, existence of oil stain) of the rocks. The operator determines the next operation based on the measured data and the information in the geology report.

JP 2008-3655 A states: Measurement by an acceleration sensor 11 and an inertial sensor 12 is repeated and, on the basis of a daily measurement result, for example, the number of steps, an average walking pace, the average number of turns, the average number of walks or stops of a user of a day, are obtained. A dictionary stored in an experience expression dictionary storage part 23 is referred to and sentences indicating the user's day's behaviors are generated according to the obtained number of steps, average walking pace, average number of turns, average number of average walks or stops, and the like, of the user.

SUMMARY

In the example of the shale oil and gas mining, geology reports are easy to understand because they are text data. However, preparation of geology reports requires human resources and much time. Accordingly, automating the preparation of geology reports leads to efficient operation. Meanwhile, geology reports are subjective and therefore, more objective geology reports enable more appropriate operation. The measured data on gamma rays and resistance is objective data but does not directly indicate the characteristics of the rocks such as color, hardness, and existence of oil stain, that are required for a geology report.

Desired is a technique that automatically prepares a text consistent with measured data on multiple variables in an environment where such measured data is obtained, like in the example of shale oil and gas mining.

An aspect of this invention is a text preparation apparatus including: a storage device; and a processor configured to operate in accordance with a program stored in the storage device. The processor is configured to: perform encoding processing to generate feature vectors from input measured data on a plurality of variables; and perform decoding processing to determine a text consistent with the measured data from the feature vectors. The feature vectors include a first feature vector representing features extracted from the entirety of the measured data and feature vector sets of measured data on individual variables. Each feature vector in a feature vector set represents a feature of a part of the measured data on the corresponding variable. In the decoding processing, the processor is configured to: perform first-layer recurrent neural network processing for phrase types to be used in the text and second-layer recurrent neural network processing for words appropriate for each of the phrase types; determine a phrase appropriate for each of the phrase types based on outputs of the second-layer recurrent neural network processing; generate a first vector set from a state vector of a previous step in the first-layer recurrent neural network processing and the feature vector sets, each vector of the first vector set being generated based on similarity degrees between individual vectors in one of the feature vector sets and the state vector; generate a second vector based on similarity degrees between individual vectors in the first vector set and the state vector; and input the second vector to a given step in the first-layer recurrent neural network processing.

An aspect of this invention enables automated generation of a text consistent with data on multiple variables measured from the object to be analyzed.

BRIEF DESCRIPTION OF THE DRAWINGS

FIG. 4 illustrates a configuration example of a geology report database;

FIG. 5 illustrates examples of rock properties to be described in geology reports and phrases to be used for individual rock properties;

FIG. 15 illustrates a configuration example of a rock property—measured variable relation table; and FIG. 16 illustrates a configuration example of a phrase—pattern relation table.

DETAILED DESCRIPTION OF THE EMBODIMENTS

Hereinafter, an embodiment of this invention is described with reference to the accompanying drawings. It should be noted that the embodiment is merely an example to implement this invention and not to limit the scope of the technical scope of this invention. Throughout the drawings, common elements are denoted by the same reference signs.

Figure 1:
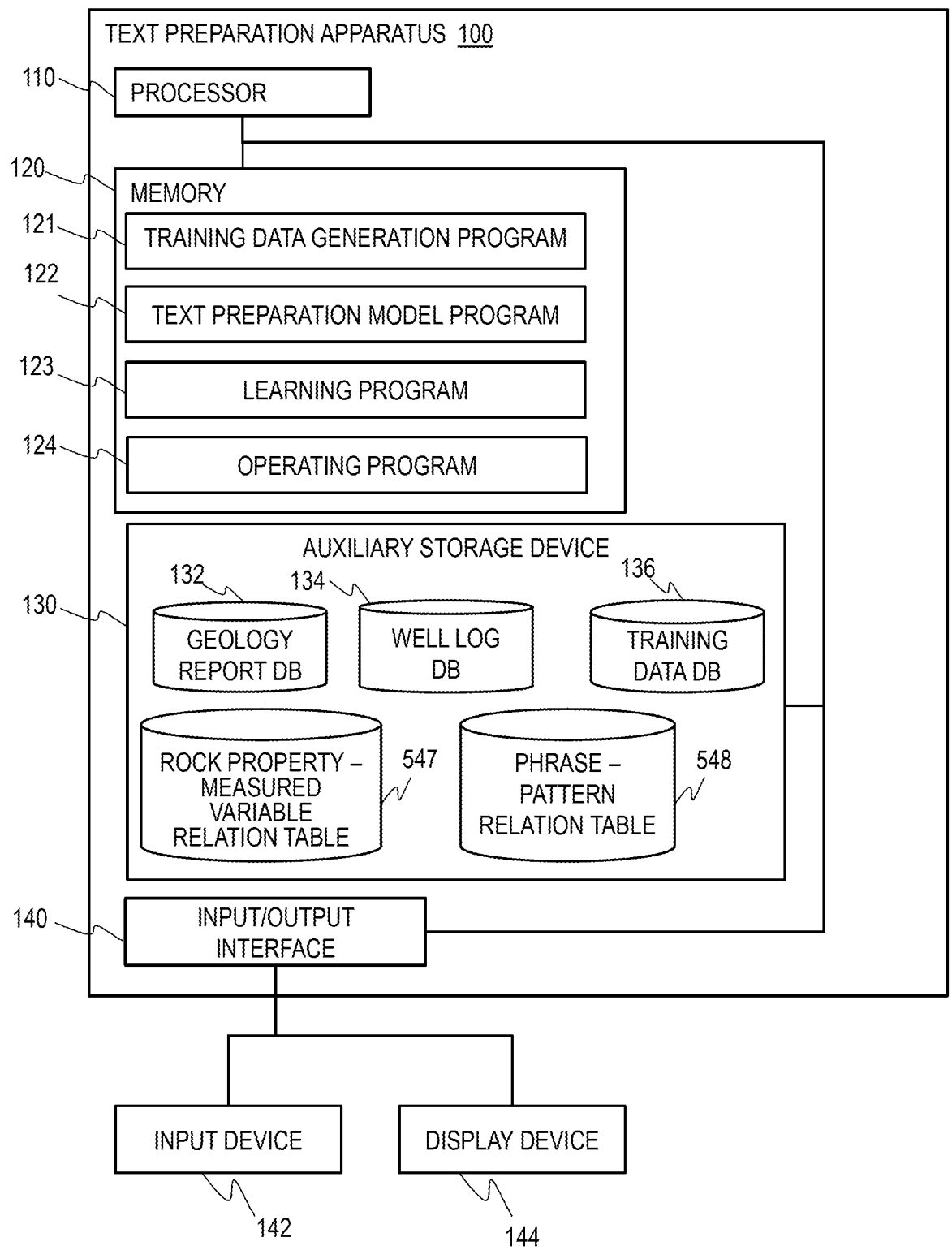
FIG. 1 illustrates a configuration example of a text preparation apparatus in an embodiment.

FIG. 1 illustrates a configuration example of a text preparation apparatus 100 in this embodiment. The text preparation apparatus 100 includes a processor 110, a memory 120, an auxiliary storage device 130, and an input/output interface 140. These elements are interconnected with one another by a bus. The memory 120, the auxiliary storage device 130, and the combination of these are examples of storage devices.

The memory 120 can be a semiconductor memory, for example, and is mainly used to hold programs and data on a temporary basis. The memory 120 stores a training data generation program 121, a text preparation model program 122, a learning program 123, and an operating program 124.

The processor 110 performs a variety of processing in accordance with the programs stored in the memory 120. The processor 110 operates in accordance with the programs to implement various function units. For example, the processor 110 operates as a training data generation unit, a text preparation model unit, a learning unit, and an operating unit in accordance with the aforementioned programs.

The auxiliary storage device 130 can be a large-capacity storage device such as a hard disk drive or a solid-state drive and is used to hold programs and data for a long time. The programs stored in the auxiliary storage device 130 are loaded to the memory 120 at boot up or as needed and the programs loaded in the memory 120 are executed by the processor 110 to perform a variety of processing of the text preparation apparatus 100. Accordingly, the processing performed by a program is processing performed by the processor 110 or the text preparation apparatus 100.

The auxiliary storage device 130 holds a geology report database 132, a well log database 134, a training data database 136, a rock property—measured variable relation table 547, and a phrase—pattern relation table 548.

The input/output interface 140 is an interface for connecting the text preparation apparatus 100 to the peripheral devices and is connected with an input device 142 and a display device 144, for example. The input device 142 is a hardware device for the user to input instructions or information to the text preparation apparatus 100 and the display device 144 is a hardware device to display various images for input or output.

The text preparation apparatus 100 has learning mode and operating mode as processing phases for the text preparation model program 122. The text preparation model program 122 is a program of a deep learning model. In operating mode, the operating program 124 inputs measured data on a plurality of variables to the text preparation model program 122. The measured data is sequential data and stored to the auxiliary storage device 130 through the input device 142, for example.

The text preparation model program 122 infers and prepares an appropriate text from the input measured data. The operating program 124 displays the prepared text on the display device 144, for example. The prepared text may be stored to the auxiliary storage device 130.

In the example described hereinafter, the measured data is data (sensor data) measured by one or more types of sensors used in well drilling and the text is a geology report. One type of sensor measures one or more variables. The concept of the deep learning in this embodiment is applicable to a field different from well drilling.

The training data generation program 121 generates training data to be used in learning mode from the geology report database 132 and the well log database 134. The training data is a plurality of pairs each composed of measured data (sensor data) on the plurality of variables and a text.

The learning program 123 inputs the measured data in the training data to the text preparation model program 122 and updates the parameters of the text preparation model program 122 based on the differences of the outputs of the text preparation model program 122 from the texts in the training data. As will be described later, the text preparation model program 122 includes a plurality of neural networks and a unit for vectorizing text data.

Figure 2:
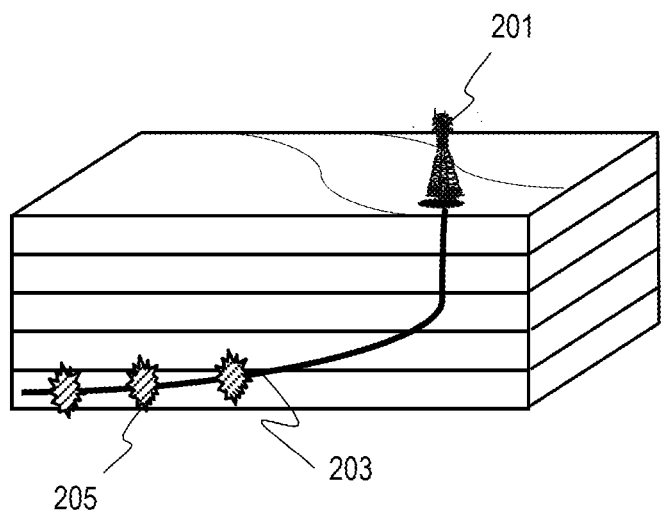
FIG. 2 illustrates a general concept of shale oil and gas drilling.

FIG. 2 illustrates a general concept of shale oil and gas drilling. The shale oil and gas drilling drills a well 201 downward and changes the direction of drilling to a horizontal direction when reaching a shale layer. The shale oil and gas drilling has a well drilling route 203. In the shale layer, the share oil and gas drilling creates a fracture 205 in the rock by hydraulic fracturing and extracts oil and/or gas from the created fracture 205.

In shale oil and gas drilling, numerical data acquired by a plurality of types of sensors attached on the drill is collected and stored to the well log database 134 as log data of well drilling. Furthermore, geology reports (text data) describing the characteristics of the rocks sampled in the drilling are prepared and stored to the geology report database 132 by an analyst. The operator determines the point to change the drilling into horizontal drilling and the point to conduct hydraulic fracturing based on the measured data and information in the geology reports.

The text preparation apparatus 100 in operating mode automatically generates a geology report from measured data. The well log database 134 and the geology report database 132 hold data on the same wells. The data in the well log database 134 and the geology report database 132 is used as training data in learning mode.

Figure 3:
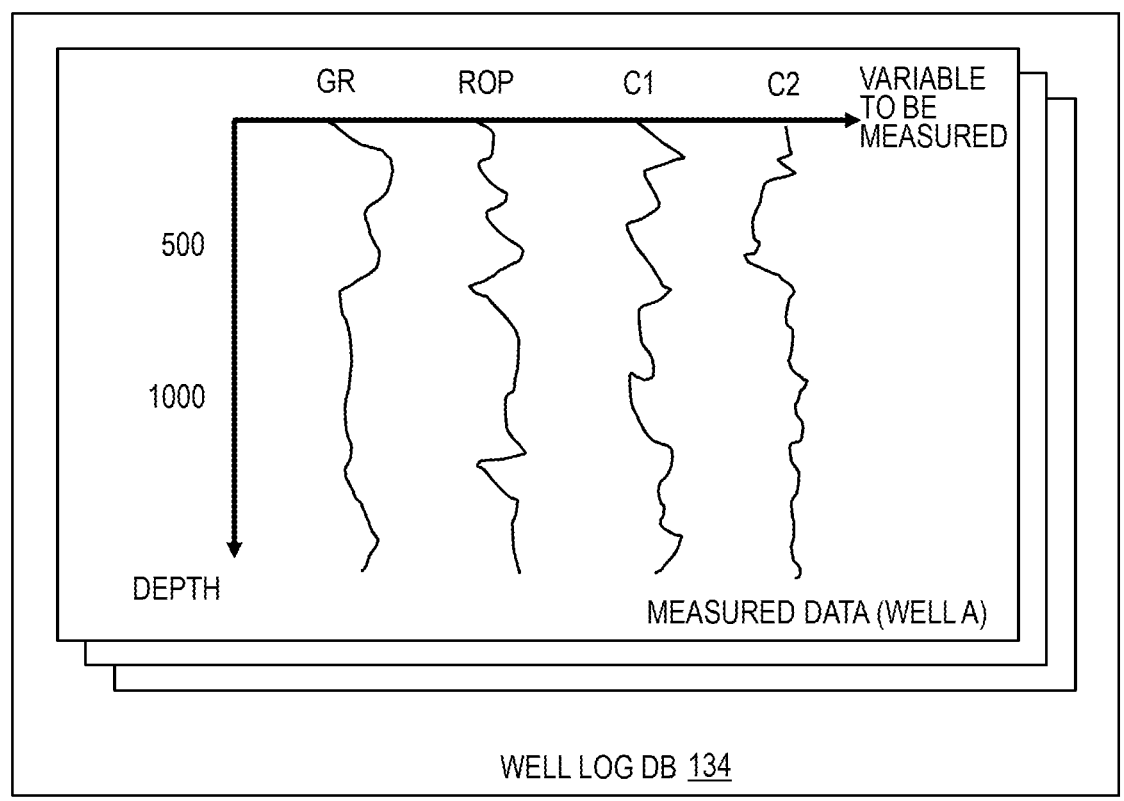
FIG. 3 illustrates a configuration example of a well log database.

FIG. 3 illustrates a configuration example of the well log database 134. The well log database 134 stores data measured in a plurality of wells. In this example, different routes having a common entrance are defined as different wells. The measured data is data acquired by one or more types of sensors in drilling a well. The measured data on one variable indicates the variation with depth in measured value. Each sensor conducts measurement with specified intervals. Each interval in acquiring measured values can be a value between 0.5 m and 1.0 m, for example.

FIG. 3 shows examples of measured data on some variables. Specifically, FIG. 3 shows measured data on gamma rays (GR), the rate of penetration (ROP), methane (C1), and ethane (C2). The variables to be measured are not limited to these. The variables to be measured can be different or the same among different wells.

FIG. 4 illustrates a configuration example of the geology report database 132. Each geology report 321 describes information such as color, hardness, and existence of oil stain on the rocks sampled in well drilling in a specified format. The geology report (text data) 321 consists of parts indicating a depth range where the rocks are obtained (sampled) and parts of detailed description of the rocks sampled from the layer in the corresponding depth range. The "depth" means the length of the drilling route from the entrance of the well. One geology report 321 is sequential data describing the characteristics of the rocks in individual depth ranges.

The detailed description of each depth range describes the physical and chemical characteristics (properties) of the rocks sampled in the corresponding depth range under predetermined rules. All the geology reports in the geology report database 132 follow these rules. The rules define the order of rock properties to be described. Each rock property is an example of a phrase type. In the example of FIG. 4, the rules define that each report describes the rock properties in the order of the color, the hardness, the existence of oil stain, the porosity, . . . . A geology report may omit to describe one or more rock properties.

FIG. 5 illustrates examples of the rock properties to be described in geology reports and the phrases to be used for individual rock properties. Each phrase consists of one or more words. As described above, the rock properties to be described in geology reports and the order of the rock properties in the geology reports are specified. One rock property is described with one or more phrases.

The text preparation apparatus 100 learns the relationship between the numerical data (measured data) in the geology report database 132 and the text data in the well log database 134. Furthermore, the text preparation apparatus 100 automatically generates a geology report from new measured data based on the leaned relationship and in accordance with the specified rules. For example, the text preparation apparatus 100 selects the rock properties one by one in accordance with the predefined order and selects one or more words for describing each rock property from a dictionary (word embedding matrix).

Generation of training data in learning mode is described. The training data generation program 121 acquires data from the geology report database 132 and the well log database 134, generates training data from the acquired data, and stores the generated training data to the training data database 136.

Figure 6:
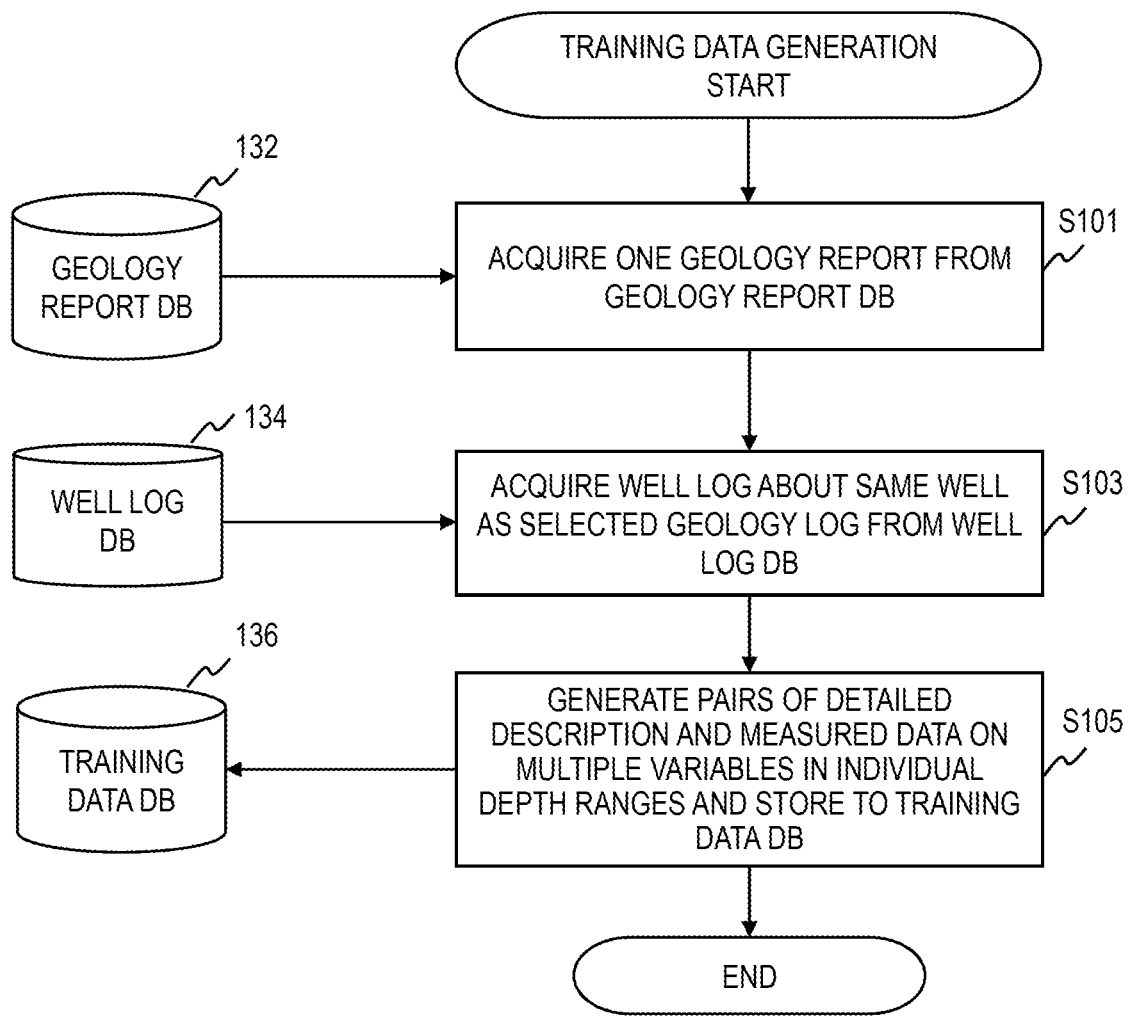
FIG. 6 is a flowchart of processing to generate training data from a geology report and a log (measured data) about one well.

FIG. 6 is a flowchart of processing to generate training data from a geology report and a log (measured data) about one well. The training data generation program 121 repeats the processing in the flowchart of FIG. 6 on a plurality of reports stored in the geology report database 132, for example, all geology reports for which the corresponding measured data (numerical data) is stored in the well log database 134.

With reference to FIG. 6, the training data generation program 121 acquires one geology report from the geology report database 132 (S101). The training data generation program 121 acquires the log (measured data on the plurality of variables) about the same well as the selected geology report from the well log database 134 (S103).

The training data generation program 121 generates pairs of a detailed description and measured data on the plurality of variables for individual depth ranges in the geology report and stores the generated pairs to the training data database 136 (S105). As described above, the intervals of measurement by the sensors (for the plurality of variables) are shorter than the intervals of generation of geology reports. A pair consists of a detailed description of the rock properties in a certain depth range and the measured data on the plurality of variables in the same depth range. The detailed description is text data. The measured data is numerical data, which indicates the variations with depth in measured values of the plurality of variables.

Figure 7:
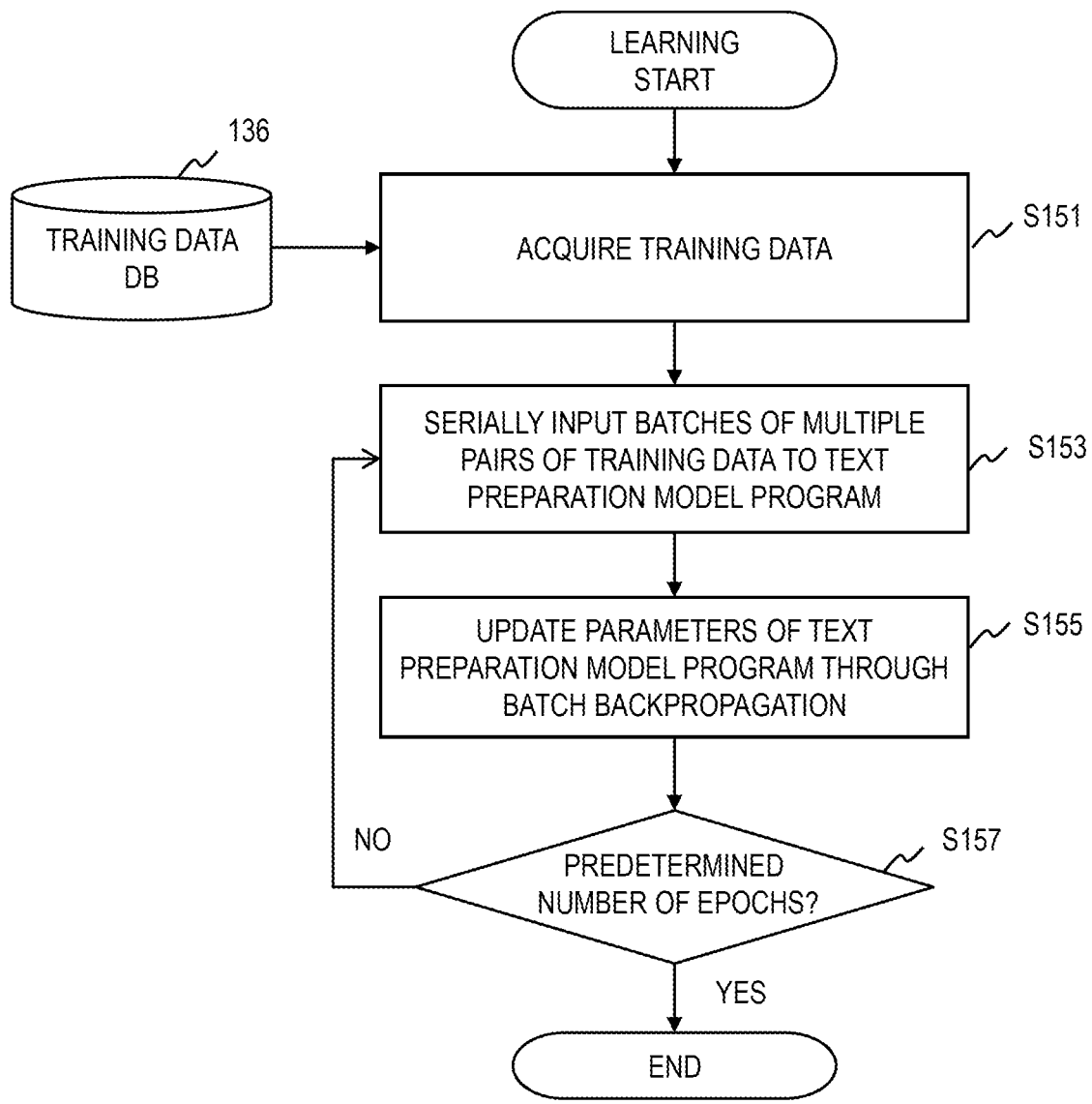
FIG. 7 is a flowchart of learning a text preparation model from training data.

FIG. 7 is a flowchart of learning a text preparation model from training data. The learning program 123 refines the relevant parameters of the text preparation model program 122 through deep learning from the training data.

The learning program 123 acquires training data from the training data database 136 (S151). The training data to be acquired is a plurality of pairs of text data of a detailed description of rock properties and numerical data of measured data on the plurality of variables.

The learning program 123 generates a plurality of batches each including a plurality of pairs of training data from the acquired training data and serially inputs the batches to the text preparation model program 122 (S153). The learning program 123 updates the parameters of the text preparation model program 122 through batch backpropagation (S155).

The learning program 123 corrects the parameters of the text preparation model program 122 using the differences between the detailed descriptions in the training data as teacher data and the texts prepared by the text preparation model program 122 and a loss function. The batch backpropagation is a known technique and detailed description thereof is omitted herein.

If the number of times of batch backpropagation reaches a predetermined number of epochs (S157: YES), the learning program 123 terminates the learning. If the number of times of batch backpropagation does not reach the predetermined number of epochs (S157: NO), the learning program 123 returns to Step S153. If the decrease in loss in the batch backpropagation is smaller than a threshold, the learning program 123 can terminate the learning without returning to Step S153.

Figure 8:
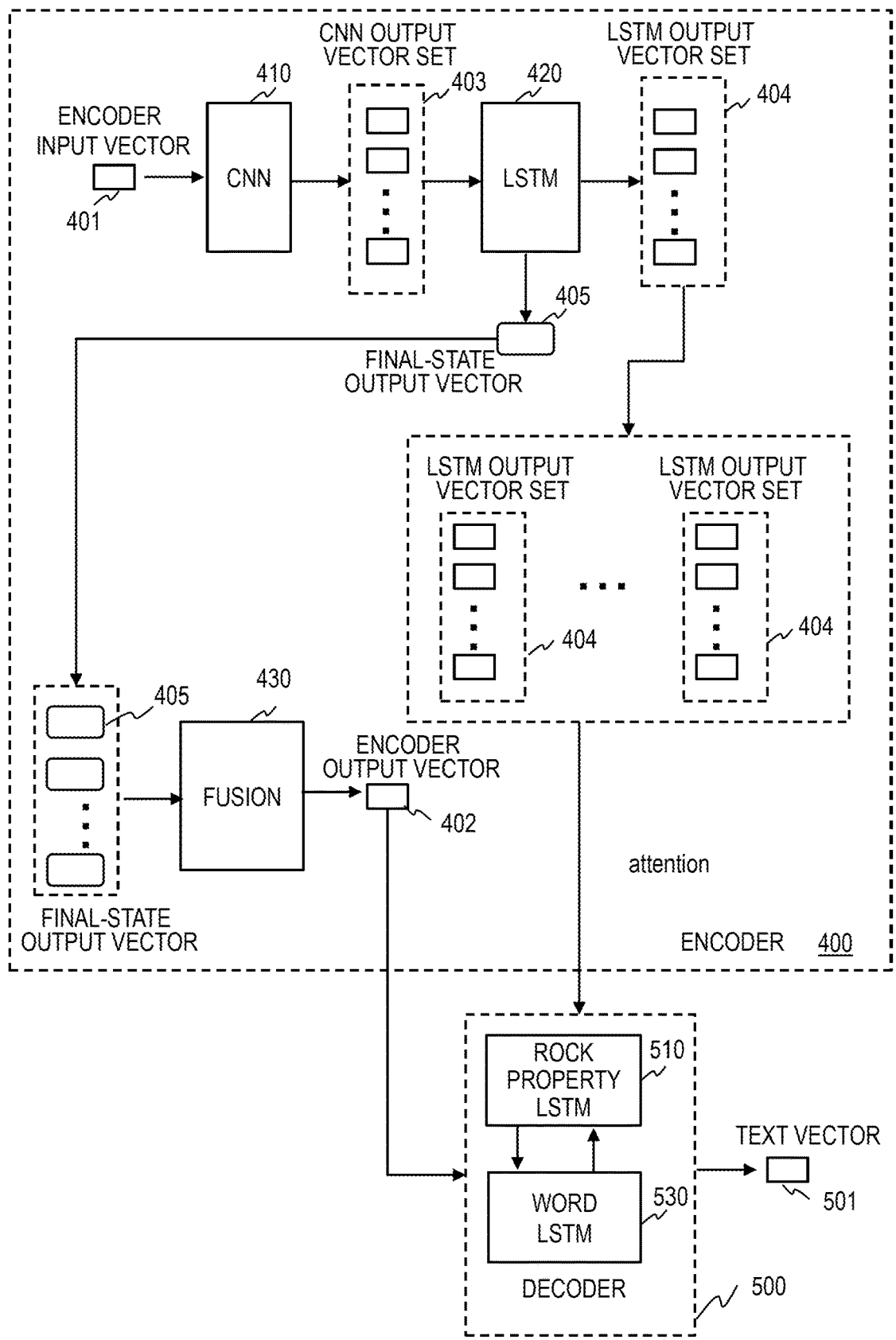
FIG. 8 schematically illustrates a configuration of a text preparation model program and an outline of processing of the text preparation model program.

FIG. 8 schematically illustrates a configuration of the text preparation model program 122 and an outline of the processing of the text preparation model program 122. The text preparation model program 122 generates a geology report from measured data using a neural network having an encoder-decoder architecture.

The text preparation model program 122 includes an encoder 400 for performing encoding and a decoder 500 for performing decoding. Input data from the external is input to the encoder 400. One input is one vector 401. In this example, a not-shown vector generator of the text preparation model program 122 generates an input vector 401 from measured data on one variable in one depth range.

For one text (geology report), a plurality of vectors 401 are serially input. Each of the plurality of input vectors 401 is generated from the measured data on the plurality of variables in the corresponding depth range for the geology report. The encoder 400 generates one encoder output vector 402 from the plurality of input vectors 401. The encoder output vector 402 is a feature vector representing the features extracted from the entire input data and having a fixed number of dimensions (vector size).

The output of the encoder 400 is the input of the decoder 500. The output of the decoder 500 is the output of the text preparation model program 122. In this example, the decoder 500 generates a vector 501 (referred to as text vector in this description) representing a detailed description of the rock properties from the feature vector 402 generated by the encoder 400. As will be described later, the decoder 500 has a hierarchical structure and learns the relationship between each rock property and the individual measured variables with an attention mechanism.

The encoder 400 includes a convolutional neural network (CNN) 410, a long short-term memory (LSTM) 420, and a fusion 430. The LSTM is an example of a recurrent neural network (RNN).

The CNN 410 extracts local features of input data and reduces the noise in the input data. The CNN 410 is a one-dimensional CNN and the input is measured data on one variable in a certain depth range. The measured data indicates variation in measured value with respect to the depth and is sequential data. The measured data on one variable is expressed as an input vector 401. Inputting measured data on a plurality of variables separately by variable for one text enables the CNN 410 to extract characteristic patterns unique to the given variable.

The CNN 410 outputs a plurality of fixed-size vectors (a vector set 403). As will be described later, the vectors in the vector set 403 correspond to feature maps provided through the filters of the convolutional layers. Although the CNN 410 can efficiently provide proper feature vectors from measured data, an algorithm different from the CNN such as fast Fourier transform (FFT) can be used to generate feature vectors of the measured data. The encoder 400 may generate a spectrogram (two-dimensional image) of the measured data on each variable using the FFT and apply the CNN to the spectrogram.

The CNN output vector set 403 is input to the LSTM 420. The LSTM 420 outputs a vector set 404 consisting of as many vectors as the vectors in the input vector set 403. The LSTM 420 further outputs a final-state output vector 405. The LSTM 420 extracts features of the measured data as sequential data that are difficult for the CNN to present sufficiently. The LSTM 420 can be optional.

In response to serial input of vectors 401 generated from the measured data on the plurality of variables, the LSTM 420 generates final-state output vectors 405 as many as the input vectors 401 and output vector sets 404 as many as the input vectors 401.

The fusion 430 fuses the plurality of final-state output vectors 405 to generate one fixed-size vector 402. The fusion 430 generates the fixed-size vector with a fully connected layer. The vector 402 is an output vector of the encoder 400 and an input vector for the decoder 500. The plurality of LSTM output vector sets 404 are referred to by (input to) an attention mechanism in the decoder 500.

The decoder 500 generates a text vector 501 from the encoder output vector 402 and the plurality of LSTM output vector sets 404. The text vector 501 represents a geology report for the input measured data. As described above, the order of rock properties to be described in the geology report is predefined. The text vector 501 indicates one or more selected words for each of the rock properties.

The text vector 501 is generated in operating mode. In learning mode, the decoder 500 outputs the probabilities of individual words for each rock property. The learning program 123 updates the parameters of the text preparation model program 122 based on the output probabilities, teacher data, and a loss function.

The decoder 500 has a hierarchical structure and includes a rock property LSTM 510 and a word LSTM 530. As will be described later, data is exchanged between the rock property LSTM 510 and the word LSTM 530. As described above, a geology report describes each of the predetermined rock properties. The hierarchical LSTM and a hierarchical attention mechanism enable individual rock properties to be described more appropriately. The decoder 500 can however have a non-hierarchical structure; in other words, a text vector 501 may be generated with a single LSTM. The processing of the CNN 410 is referred to as convolutional neural network processing (CNN processing). The processing of each of the LSTMs 420, 510, and 530 is referred to as LSTM processing. The LSTM processing is an example of recurrent neural network processing.

Figure 9:
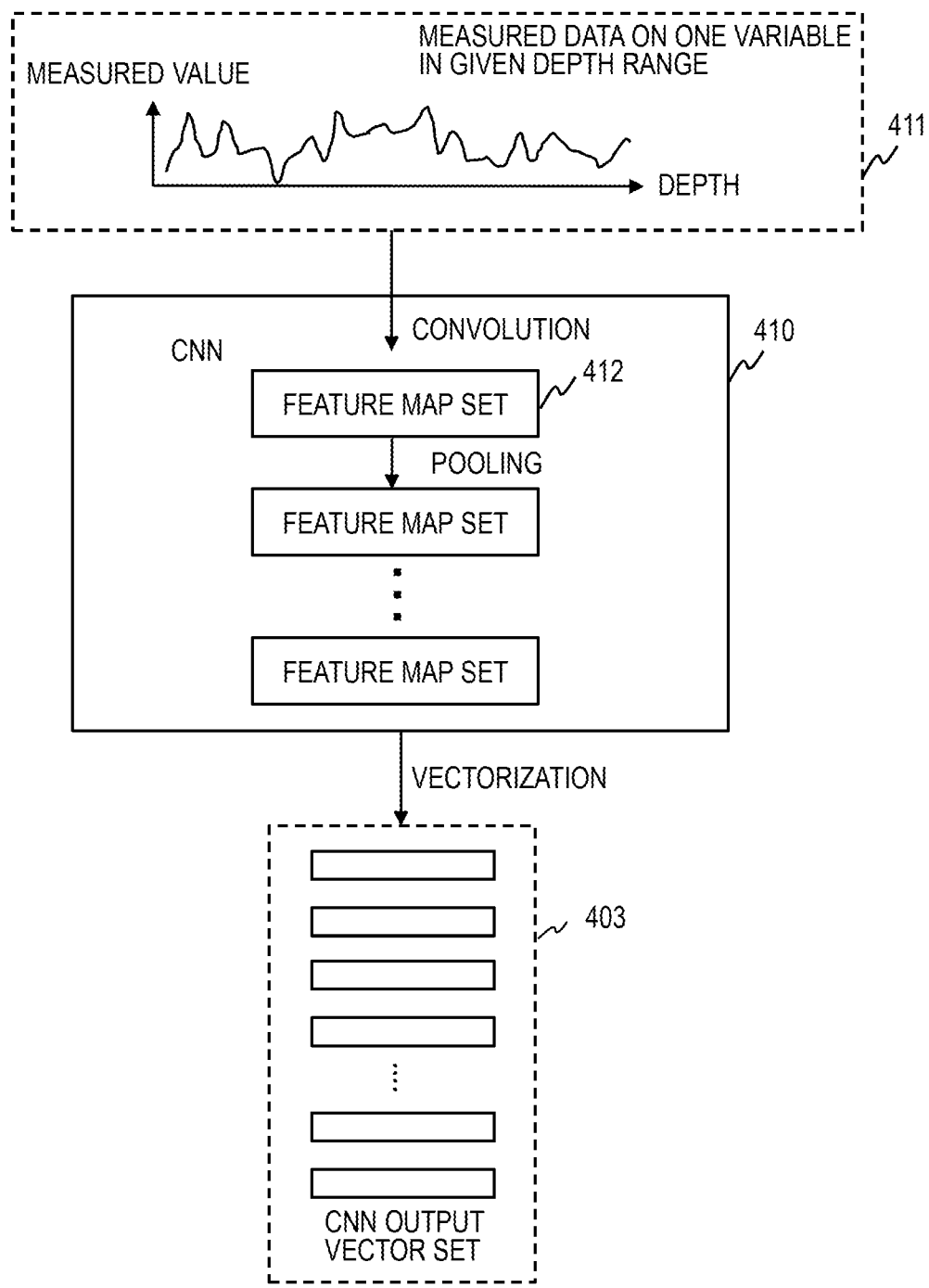
FIG. 9 schematically illustrates processing of a CNN.

Hereinafter, elements of the text preparation model program 122 are described in detail. FIG. 9 schematically illustrates processing of the CNN 410. As described above, measured data on the plurality of variables in one depth range for a geology report is serially input to the CNN 410. FIG. 9 provides an example where input is measured data 411 on one variable. The input measured data is expressed as a vector.

The CNN 410 has stacked convolutional layers and pooling layers to repeat convolution and pooling. The convolution filters the input data with a plurality of window filters to generate a plurality of feature maps (a feature map set) 412. One filter calculates product sums of the values in the filter while sliding in the input data to generate one feature map.

The convolution extracts local features of the measured data. The pooling reduces the size of the feature maps to aggregate the local features. The CNN 410 vectorizes the plurality of feature maps to generate a CNN output vector set 403 consisting of a plurality of fixed-size vectors. Each vector in the CNN output vector set 403 is a feature vector representing the feature of a part of the measured data. The numbers of the convolutional layers and the pooling layers depend on the design and the pooling layers can be optional.

Figure 10:
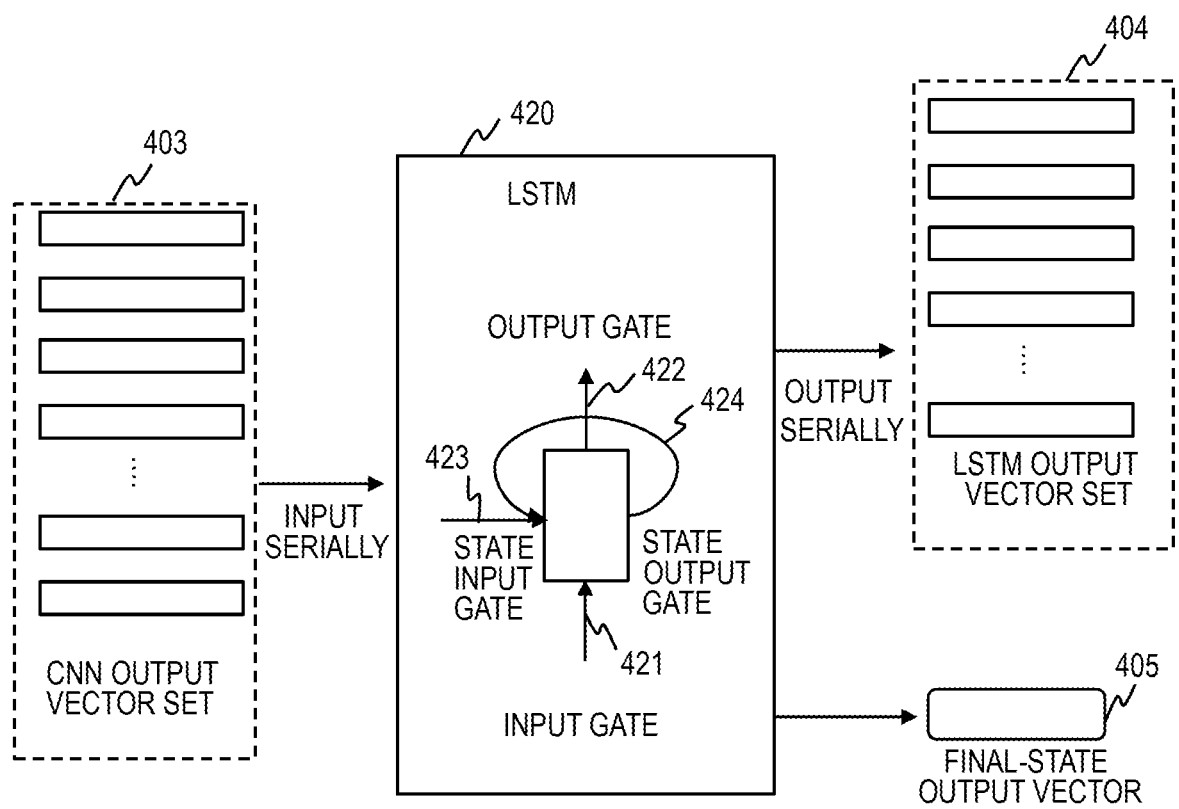
FIG. 10 schematically illustrates processing of an LSTM.

FIG. 10 schematically illustrates processing of the LSTM 420. The LSTM is an RNN and has a network structure that inputs a value of a hidden layer to the hidden layer again. The RNN has a memory to memorize information calculated previously. The RNN uses information in the data up to the moment to take in the sequential information in the input data. The LSTM can use information in a longer period.

The output data of the LSTM 420 represents the feature of the measured data as sequential data. The LSTM (LSTM unit) 420 has a state input gate 423 and a state output gate 424 in addition to normal data input gate 421 and data output gate 422.

The LSTM 420 serially acquires a plurality of vectors of a CNN output vector set 403 and serially outputs vectors of an LSTM output vector set 404. One vector selected from the CNN output vector set 403 is input to the data input gate 421. One corresponding vector for the LSTM output vector set 404 is output from the data output gate 422. The vectors of the LSTM output vector set 404 correspond to the vectors of the CNN output vector set 403 one to one. Accordingly, each vector of the LSTM output vector set 404 is a feature vector representing the feature of a part of the measured data.

To the state input gate 423, vectors from the state output gate 424 are input. The first input to the state input gate 423 is a specified initial vector. In response to the final input vector from the CNN output vector set 403, the LSTM 420 outputs a vector from the state output gate 424 as a final-state output vector 405.

Figure 11:
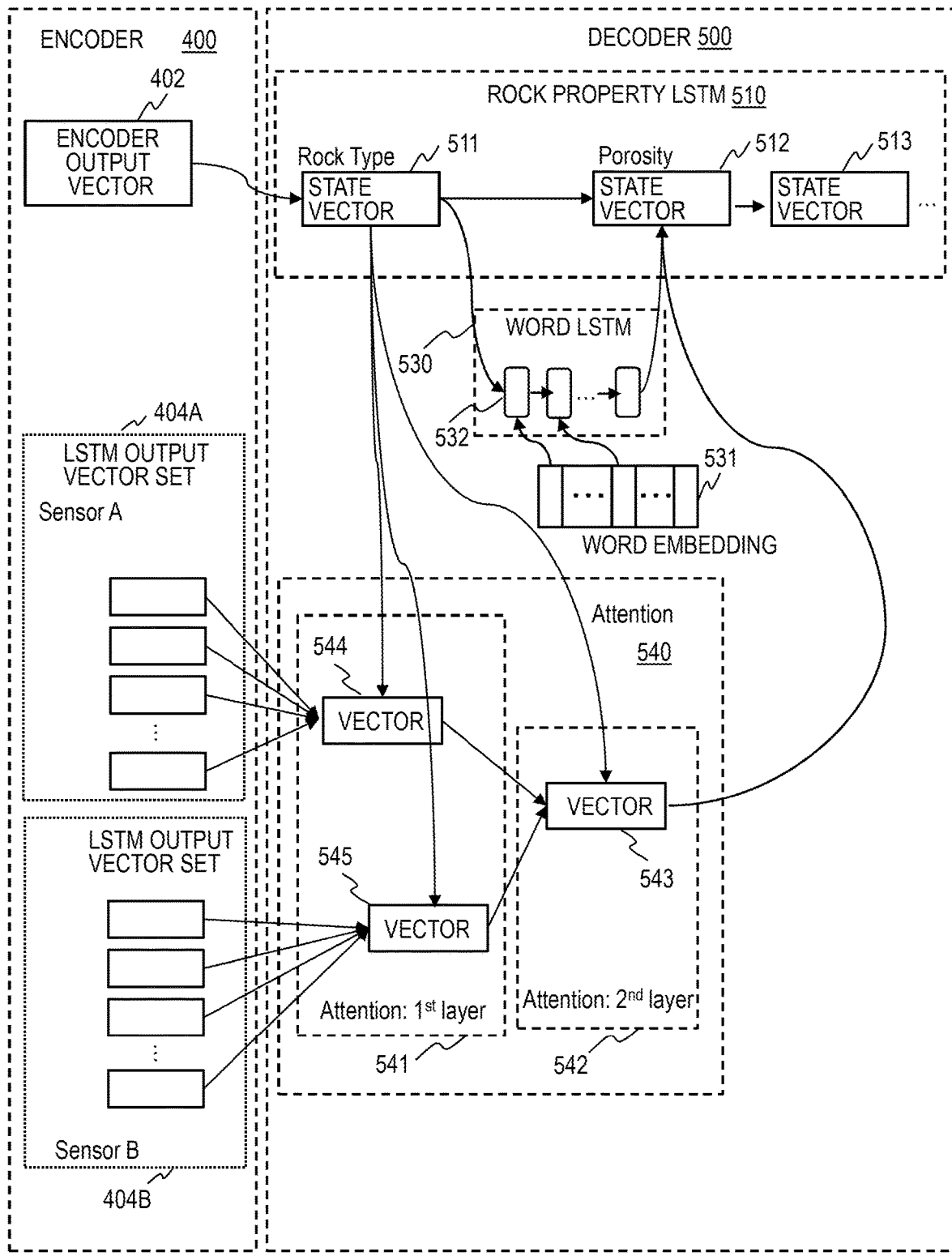
FIG. 11 schematically illustrates processing of a decoder.

FIG. 11 schematically illustrates processing of the decoder 500. In the example of FIG. 11, two types of measured data (measured data on two variables) are input to the encoder 400. The encoder 400 generates an LSTM output vector set 404A for variable A and an LSTM output vector set 404B for variable B. The encoder output vector 402 is generated from the final-state output vector generated by the LSTM 420 from the measured data on variable A and the final-state output vector generated by the LSTM 420 from the measured data on variable B.

The rock property LSTM 510 serially generates hidden state vectors by iterative processing. FIG. 11 shows three state vectors 511 to 513 by way of example. A state vector generated at one step is input to the next step. Each step of the rock property LSTM 510 receives three inputs. One is the state vector output from the previous step, one is a vector output from the attention mechanism 540, and the remaining is an output from the word LSTM 530.

The word LSTM 530 receives an input from each step of the rock property LSTM 510 and iterates iterative processing (a loop). In a loop of iterative processing, the word LSTM 530 receives a vector from a step of the rock property LSTM 510 and outputs a vector to the next step of the rock property LSTM 510.

The word LSTM 530 serially generates a hidden state vector 532 and a data output vector in a loop of iterative processing. A hidden state vector 532 is input to the next step. The final-state vector 532 in a loop of iterative processing is input to the next step of the rock property LSTM 510.

The data output vectors from the word LSTM 530 are to determine a word to be used. The word LSTM 530 serially outputs words to describe the given rock property through iterative processing. The data output vectors are input to a not-shown softmax function, for example. The softmax function provides probabilities of individual words. In operating mode, the decoder 500 selects a word having the highest probability. In learning mode, the learning program 123 updates the parameters of the decoder 500 so that the probability of the word in the training data will be the highest.

At each step of the word LSTM 530, a vector of the previous word generated by the word embedding matrix 531 is input. The word embedding matrix 531 generates a vector of such a word using an index of words. In operating mode, the decoder 500 inputs the index of the word selected at the previous step (the word having the highest probability) to the word embedding matrix 531 to generate the vector of the word to be input to the given step.

In learning mode, the learning program 123 searches the word embedding matrix 531 for the index of the previous word in the training data to determine the vector of the word to be input to the given step. The word embedding matrix 531 is one of the objects to be trained in the learning, like the CNN 410, the LSTM 420, the rock property LSTM 510, and the word LSTM 530.

Each text for a rock property starts with a start symbol and ends with an end symbol. In either mode, the word vector input to the first step of the word LSTM 530 is a vector of the start symbol. The number of steps in the word LSTM 530 is fixed. If the number of steps in the word LSTM 530 is more than the number of words in the text, a specific symbol is added after the end symbol.

The input to the first step of the word LSTM 530 in a loop of iterative processing is the state vector of the rock property LSTM 510 and the vector of the start symbol generated by the word embedding matrix 531. The input to the second and the subsequent steps is the state vector output from the previous step and the vector of the word selected at the previous step. The state vector of the final step (the final-state output vector) is input to the next step of the rock property LSTM 510.

The decoder 500 has a two-step attention mechanism 540. A vector generated by the attention mechanism 540 is input to the rock property LSTM 510. The attention mechanism 540 has a first layer 541 and a second layer 542.

FIG. 11 provides an example where a vector 543 generated by the attention mechanism 540 is input in generating the state vector 512. A vector generated by the attention mechanism 540 is input at each step of the rock property LSTM 510 (in generating each state vector). The attention mechanism 540 generates a vector to input to the given step of the rock property LSTM 510 from the state vector of the previous step of the rock property LSTM 510 and the LSTM output vector sets 404A and 404B.

The encoder output vector 402 is input to the first step of the rock property LSTM 510. A vector from the attention mechanism 540 is input to the rock property LSTM 510 together with the encoder output vector 402. The attention mechanism 540 generates the vector to be input to the rock property LSTM 510 from the encoder output vector 402 and the LSTM output vector sets 404A and 404B. Furthermore, an initial value corresponding to the output from the word LSTM 530 is input to the first step of the rock property LSTM 510.

The output vector from the first step of the rock property LSTM 510 is input to the first step of the word LSTM 530. The word LSTM 530 outputs a state vector and data vectors to select a word from the output vector generated from the rock property LSTM 510 and the word vector of the start symbol from the word embedding matrix 531. The softmax function indicates the probabilities of the words from the data vectors; a word with the highest probability is selected in operating mode.

The word LSTM 530 repeats a step using the state vector from the previous step and the word vector of the previous word from the word embedding matrix 531 as inputs. The state vector from the final step is input to the rock property LSTM 510.

The rock property LSTM 510 at the second and subsequent steps receives the state vector of the previous step, the vector from the attention mechanism 540, and the final state vector from the word LSTM 530 as inputs. The attention mechanism 540 generates a vector to input to the given step of the rock property LSTM 510 from the state vector of the previous step of the rock property LSTM 510 and the LSTM output vector sets 404A and 404B.

Figure 12:
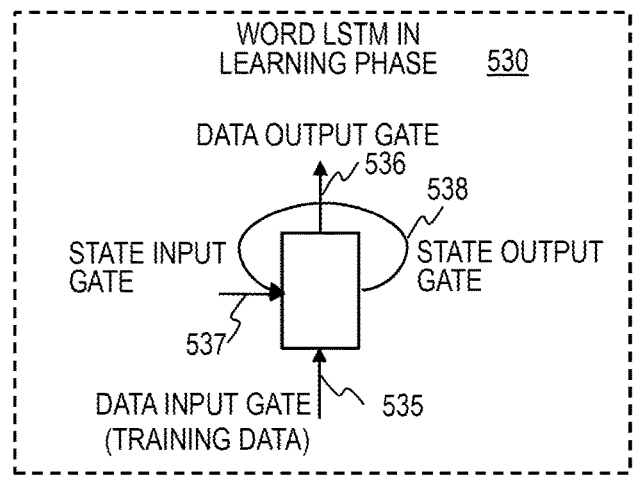
FIG. 12 schematically illustrates processing of a word LSTM in learning mode.

FIG. 12 schematically illustrates processing of the word LSTM 530 in learning mode. The word LSTM 530 has a data input gate 535, a data output gate 536, a state input gate 537, and a state output gate 538. Word vectors of the words in training data generated by the word embedding matrix 531 are serially input to the data input gate 535 in iterative steps.

The first word of the training data is a start symbol and the final word is an end symbol. If the number of words in the training data is more than the number of steps of the word LSTM 530, a specific symbol is added after the end symbol.

The vector from the data output gate 536 is transformed by the softmax function to a vector representing the probability of the word. The vector representing the probability of the word is used to calculate the loss in the learning.

The vector from the state output gate 538 is input to the state input gate 537. The initial vector for the state input gate 537 is the state vector output from the rock property LSTM 510. The final-state vector from the state output gate 538 is input to the next step of the property LSTM 510.

Figure 13:
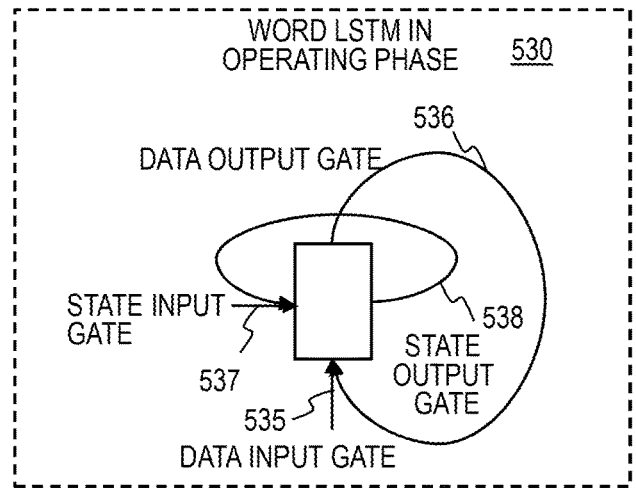
FIG. 13 schematically illustrates processing of a word LSTM in operating mode.

FIG. 13 schematically illustrates processing of the word LSTM 530 in operating mode. The difference from the processing in learning mode is the word vector to be input to the data input gate 535. In operating mode, the decoder 500 transforms the vectors from the data output gate 536 with the softmax function and selects the word having the highest probability as the word to be included in the geology report.

The decoder 500 inputs the word vector of the word selected from the word embedding matrix 531 to the data input gate 535 for the next step. The initial vector for the data input gate 535 is the word vector of the start symbol. Subsequently, the decoder 500 selects the vector of the word having the highest probability at the data output gate 536 from the word embedding matrix 531 and inputs it to the data input gate 535 for the next step.

The input vector to the state input gate 537 and the output vector from the state output gate 538 in operating mode are the same as the vectors in learning mode.

Figure 14:
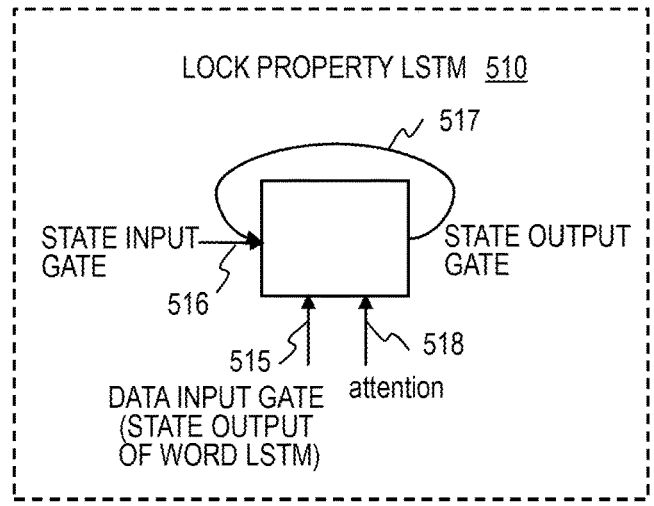
FIG. 14 schematically illustrates processing of a rock property LSTM.

FIG. 14 schematically illustrates processing of the rock property LSTM 510. The rock property LSTM 510 has two data input gates 515 and 518, a state input gate 516, and a state output gate 517. The vector from the state output gate 517 is input to the state input gate 516. The initial vector for the state input gate 516 is the encoder output vector 402 from the encoder 400.

The final-state output vector from the state output gate 538 in the iterative processing of the word LSTM 530 for the previous rock property is input to the data input gate (hereinafter, referred to as word input gate) 515. The initial vector for the word input gate 515 is a predetermined vector. The vector 543 from the attention mechanism 540 is input to the data input gate (hereinafter, referred to as attention input gate) 518.

The attention mechanism 540 generates a vector to be input to the given step of the rock property LSTM 510 from the state vector at the previous step of the rock property LSTM 510 and the LSTM output vector sets 404A and 404B. The vector for the first step is generated from an encoder output vector 402 and LSTM output vector sets 404A and 404B.

As illustrated in FIG. 11, the attention mechanism 540 has a two-layer structure having the first layer 541 and the second layer 542. The encoder output vector 402 is a fixed-length vector and therefore, information on measured data can be partially missing. The two-layered attention mechanism 540 can provide more information from the measured data from the perspective of the state of the rock property LSTM 510.

The first layer 541 compares the state vector output from the rock property LSTM 510 with the LSTM output vector sets of individual variables to generate a plurality of vectors. In the example of FIG. 11, the first layer 541 compares the state vector 511 output from the rock property LSTM 510 with the LSTM output vector sets 404A and 404B separately to generate vectors 544 and 545.

The first layer 541 generates vectors of the individual variables using the weighted sum calculated by the following formula (1):

$$t = \sum_i a_i \times sim(a_i, q) \tag{1}$$

where $a_i$ is each vector in an LSTM output vector set; q is a state vector output from the rock property LSTM 510; and $sim(a_i,q)$ is the similarity degree between the vectors and is given by the following formula (2) or (3):

$$sim(a_i,q) = a_i^T q \tag{2}$$

$$sim(a_i,q) = a_i^T M_1 q \tag{3}$$

where $M_1$ is a variable in the learning. Note that $sim(a_i,q)$ can be calculated by a different formula.

Formula (1) multiplies each of the LSTM output vectors by a weight and calculates the total sum. The weight for an LSTM output vector is the similarity degree between the LSTM output vector and the state vector of the rock property LSTM 510. The weight is greater as the similarity between the LSTM output vector and the state of the rock attribute LSTM 510 is higher. The formula (1) yields a result that, in measured data on one variable, data in a depth range more similar to the state of the rock property LSTM 510 of the previous step affects more the next step.

The second layer 542 generates an output vector of the attention mechanism 540 using the weighted sum calculated by the following formula (4):

$$p = \sum_i t_i \times sim(t_i, q) \tag{4}$$

where $t_i$ is each vector generated by the first layer 541; q is a state vector output from the rock property LSTM 510; and $sim(t_i,q)$ is the similarity degree between the vectors and is given by the following formula (5) or (6):

$$sim(t_i,q) = t_i^T q \tag{5}$$

$$sim(t_i,q) = t_i^T M_2 q \tag{6}$$

where $M_2$ is a variable in the learning. Note that $sim(t_i,q)$ can be calculated by a different formula.

Formula (4) multiplies each of the output vectors of the first layer 541 by a weight and calculates the total sum. The weight for an output vector of the first layer 541 is the similarity degree between the output vector of the first layer 541 and the state vector of the rock property LSTM 510. The weight is greater as the similarity between the output vector of the first layer 541 and the state of the rock attribute LSTM 510 is higher. The formula (4) yields a result that, in measured data on a plurality of variables, data on a variable more similar to the state of the rock property LSTM 510 of the previous step affects more the next step.

As described above, through deep learning from training data made of measured data and geology reports in well drilling, the text preparation apparatus 100 can infer and generate a geology report consistent to data measured in well drilling from the measured data. The text preparation apparatus 100 is applicable to a field different from the well drilling by changing the training data. The text preparation apparatus 100 refines the parameters through deep learning from training data made of pairs of data measured from an object and a text about the object. The text preparation apparatus 100 receives data that is of the same types as the training data and measured from a given object, and infers and generates a text about the given object.

FIG. 15 illustrates an example of the rock property—measured variable relation table 547 indicating the relations between rock properties and measured variables. The learning program 123 displays information in the rock property—measured variable relation table 547 on the display device 144 in response to an input from the user through the input device 142. The user can know the learning results on the relations between rock properties and measured variables with reference to the information in the rock property—measured variable relation table 547.

For example, the learning program 123 that has received a designation of a rock property or a measured variable from the input device 142 displays the most relevant measured variable or rock property on the display device 144. The learning program 123 may provide the relations between the designated rock property and all measured variables or the relations between the designated measured variable and all rock properties.

FIG. 15 shows an example of six rock properties and six variables. Each cell in the rock property—measured variable relation table 547 indicates the weight (relevancy) of the variable for the rock property. For example, for the rock property of "Rock Type", the variable C1 is affected most (most relevant) among the plurality of variables.

The rock property—measured variable relation table 547 stores values acquired from the similarity degrees calculated in the second layer 542 of the attention mechanism 540 in learning mode. The learning program 123 generates the rock property—measured variable relation table 547 through the steps described as follows.

The learning program 123 generates an intermediate table having the same configuration as the rock property—measured variable relation table 547 for each pair of a geology report and measured data on the plurality of variables (each pair of training data) and stores the statistics of the values in the rock property—measured variable relation tables to the rock property—measured variable relation table 547.

A method of generating the intermediate table having the same configuration as the rock property—measured variable relation table 547 from a pair of data in training data is described. The learning program 123 acquires $sim(t_i,q)$ in all variables at each step of the lock property LSTM 510. In the example of FIG. 15, learning program 123 acquires six $sim(t_i,q)$ per step.

At each step of the lock property LSTM 510, the learning program 123 generates a vector S (s_1, ... s_M) from the acquired $sim(t_i,q)$, where $s\_i=sim(t_i,q)$ and M is the number of variables, which is 6 in the example of FIG. 15. The vector S in one step of the rock property LSTM 510 corresponds to the records for the rock property of the step. The matrix composed of the vectors S in all steps of the rock property LSTM 510 is the data for the intermediate table of this training data.

The learning program 123 generates intermediate tables for all the training data pairs. The learning program 123 calculates the statistics of each cell from the intermediate tables to determine the value for the final rock property—measured variable relation table 547. For example, the average value of the cell is the value for the rock property—measured variable relation table 547.

FIG. 16 illustrates an example of the phrase—pattern relation table 548 indicating the relations between phrases for geology reports and patterns extracted from measured data. The learning program 123 displays information in the phrase—pattern relation table 548 on the display device 144 in response to an input from the user. The user can know the learning results on the relations between phrases for geology reports and patterns extracted from measured data with reference to the information in the phrase—pattern relation table 548.

For example, the learning program 123 that has received a designation of a phrase from the input device 142 displays the most relevant measured variable and pattern on the display device 144. The learning program 123 may receive designation of a measured variable from the input device 142 and display the most relevant phrase and relevant patterns on the display device 144.

The phrase—pattern relation table 548 has columns of phrases 910, measured variables 920, and patterns 930. A measured variable column 920 indicates a measured variable most relevant to the phrase in the corresponding phrase column 910. A pattern column 930 indicates one or more patterns relevant to the phrase. In the case where one phrase is relevant to a plurality of measured variables, a plurality of records are provided for one phrase.

A method of determining the most relevant measured variable and relevant patterns to a phrase in one training data pair is described. The learning program 123 determines that a measured variable most relevant to the rock property the phrase belongs to is the measured variable most relevant to the phrase. The relevancy between a rock property and a measured variable can be determined by the method described with reference to FIG. 15.

The learning program 123 determines patterns based on $sim(a_i,q)$ calculated in the first layer 541 of the attention mechanism 540. The learning program 123 determines the vector ad having the highest value in $sim(a_i,q)$ of the measured variable most relevant to a phrase for a rock property. As illustrated in FIG. 8, the vector ad is an output of the LSTM 420 and there is one corresponding CNN output vector.

Each CNN output vector represents the summary of a part (segment) of the input measured data and the part corresponding to a CNN output vector is determined based on the structure of the CNN 410. In other words, the position of an LSTM output vector $a_i$ within a sequence determines the corresponding part in the input measured data. The learning program 123 determines the pattern of the part corresponding to the $a_i$ having the highest $sim(a_i,q)$ to be the pattern relevant to the phrase in the training data pair In the case where a plurality of patterns are acquired for the same phrase from a plurality of training data pairs, the learning program 123 includes all the patterns into the phrase—pattern relation table 548. The learning program 123 may create a typical pattern from a plurality of patterns. For example, the learning program 123 separates the patterns into a plurality of groups based on the similarity of patterns and calculates an average pattern of each group. The learning program 123 includes the average pattern of each group into the phrase—pattern relation table 548.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated to a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card or an SD card.

The drawings show control lines and information lines as considered necessary for explanations but do not show all control lines or information lines in the products. It can be considered that most of all components are actually interconnected.

What is claimed is:

1. A text preparation apparatus comprising:
   a storage device; and
   a processor configured to operate in accordance with a program stored in the storage device,
   wherein the processor is configured to:
   retrieve a plurality of variables gathered from a plurality of sensors attached to a drill performing a drilling process in an oil well, the plurality of variables consisting of more than one of a gamma ray variable, a rate of penetration variable, a methane variable, an ethane variable, and a resistance variable;

perform encoding processing to generate a long short-term memory (LSTM) feature vector set from the plurality of variables gathered from the plurality of sensors attached to the drill performing the drilling process in the oil well, wherein, in the encoding processing, the processor is configured to:
generate a plurality of two-dimensional spectrograms that each correspond to a respective variable of the plurality of variables;
generate a plurality of feature vectors by applying each of the plurality of two-dimensional spectrograms to a convolutional neural network that outputs the plurality of feature vectors; and
provide the plurality of feature vectors as input to an LSTM model that generates the LSTM feature vector set and a state vector; and
perform decoding processing to generate a geology report indicating rock characteristics of rocks subject to the drilling process in the oil well that are consistent with the feature vectors encoded from the plurality of variables, wherein, in the decoding processing, the processor is configured to:
perform first-layer recurrent neural network processing for rock properties to be used in the geology report and second-layer recurrent neural network processing for words appropriate for each of the rock properties to be used in the geology report;
determine a phrase appropriate for each of the rock properties based on a phrase-pattern relation table and outputs of the second-layer recurrent neural network processing;
generate a first vector set from the state vector of a previous step in the first-layer recurrent neural network processing and the LSTM feature, vector set, each vector of the first vector set being generated based on similarity degrees between individual vectors in the LSTM feature vector set and the state vector;
generate a second vector based on similarity degrees between individual vectors in the first vector set and the state vector;
input the second vector to a given step in the first-layer recurrent neural network processing; and
generate the geology report including the phrase appropriate for each of the rock properties determined based on the phrase-pattern relation table and the outputs of the second-layer recurrent neural network processing.

2. The text preparation apparatus according to claim 1, wherein the processor is configured to learn parameters in the encoding processing and the decoding processing from a plurality of training data pairs, and
wherein each pair of the plurality of training data pairs comprises measured data including a plurality of second variables of a certain depth range of a second oil well and a second geology report of the certain depth range for the second oil well.

3. The text preparation apparatus according to claim 1, wherein the processor is configured to learn parameters in the encoding processing and the decoding processing from a plurality of training data pairs,
wherein each pair of the plurality of training data pairs comprises measured data of a plurality of second variables corresponding to a plurality of second oil wells and a second geology report of a second oil well, and
wherein the processor is configured to determine relations between the rock properties and the plurality of second variables of the second oil well based on similarity degrees between individual vectors in the first vector set and the state vector in the learning from the plurality of training data pairs.

4. The text preparation apparatus according to claim 1, wherein the processor is configured to learn parameters in the encoding processing and the decoding processing from a plurality of training data pairs,
wherein each pair of the plurality of training data pairs comprises measured data on a plurality of second variables and a second geology report of a second oil well, and
wherein the processor is configured to determine a feature pattern relevant to a phrase consistent with the state vector in the measured data on a variable represented by a feature vector set, based on similarity degrees between individual vectors in the feature vector set and the state vector in the learning from the plurality of training data pairs.

5. A method for a text preparation apparatus to prepare a text, the text preparation apparatus including a storage device and a processor configured to operate in accordance with a program stored in the storage device, and the method comprising:
retrieving, by the processor, a plurality of variables gathered from a plurality of sensors attached to a drill performing a drilling process in an oil well, the plurality of variables consisting of more than one of a gamma ray variable, a rate of penetration variable, a methane variable, an ethane variable, and a resistance variable;
performing, by the processor, encoding processing to generate a long short-term memory (LSTM) feature vector set from the plurality of variables gathered from the plurality of sensors attached to the drill performing the drilling process in the oil well, wherein the encoding processing includes:
generating, by the processor, a plurality of two-dimensional spectrograms that each correspond to a respective variable of the plurality of variables;
generating, by the processor, each of the feature rectors by applying each of the plurality, of two-dimensional spectrograms to a convolutional neural network that outputs the feature vectors; and
provide the plurality of feature vectors as input to an LSTM model that generates the LSTM feature vector set and a state vector; and
performing, by the processor, decoding processing to generate a geology report indicating rock characteristics of rocks subject to the drilling process in the oil well that are consistent with the feature vectors encoded from the plurality of variables, wherein the decoding processing includes:
performing, by the processor, first-layer recurrent neural network processing for rock properties to be used in the geology report and second-laver recurrent neural network processing for words appropriate for each of the rock properties to be used in the geology report;
determining, by the processor, a phrase appropriate for each of the rock properties based on a phrase-pattern relation table and outputs of the second-layer recurrent neural network processing;
generating, by the processor, a first vector set from the state vector of a previous step in the first-layer recurrent neural network processing and the LSTM feature vector set, each vector of the first vector set being generated based on similarity degrees between individual vectors in one of the LSTM feature vector set and the state vector;

generating, by the processor, a second vector based on similarity degrees between individual vectors in the first vector set and the state vector;

inputting, by the processor, the second vector to a given step in the first-layer recurrent neural network processing; and generating, by the processor, the geology report including the phrase appropriate for each of the rock properties determined based on the phrase-pattern relation table and the outputs of the second-layer recurrent neural network processing.

6. A text preparation apparatus comprising:

an encoder configured to:

retrieve a plurality of variables gathered from a plurality of sensors attached to a drill performing a drilling process in an oil well, the plurality of variables consisting of more than one of a gamma ray variable, a rate of penetration variable, a methane variable, an ethane variable, and a resistance variable; and generate a long short-term memory (LSTM) feature vector set from the plurality of variables gathered from the plurality of sensors attached to the drill performing the drilling process in the oil well, wherein the LSTM feature vector set is generated based on the encoder:

generating a plurality of two-dimensional spectrograms that each correspond to a respective variable of the plurality of variables;

applying each of the plurality of two-dimensional spectrograms to a convolutional neural network that outputs a plurality of feature vectors; and provide the plurality of feature vectors as input to an LSTM model that generates the LSTM feature vector set and a state vector; and a decoder configured to generate a geology report indicating rock characteristics of rocks subject to the drilling process in the oil well that are consistent with the feature vectors encoded from the plurality of variables, wherein the decoder includes a first-layer recurrent neural network for rock properties to be used in the geology report and a second-layer recurrent neural network processing for words appropriate for each of the rock properties to be used in the geology report, and wherein the decoder is configured to:

determine a phrase appropriate for each of the rock properties based on a phrase-pattern relation table and outputs of the second-layer recurrent neural network;

generate a first vector set from the state vector of a previous step in the first-layer recurrent neural network and the feature vector sets, each vector of the first vector set being generated based on similarity degrees between individual vectors in the LSTM feature vector set and the state vector;

generate a second vector based on similarity degrees between individual vectors in the first vector set and the state vector;

input the second vector to a given step in the first-layer recurrent neural network; and generate the geology report including the phrase appropriate for each of the rock properties determined based on the phrase-pattern relation table and the outputs of the second-layer recurrent neural network processing.

* * * * *